(12) United States Patent
Vikstedt et al.

(10) Patent No.: US 8,260,286 B2
(45) Date of Patent: Sep. 4, 2012

(54) METHOD, APPARATUS AND SYSTEM FOR TESTING USER EQUIPMENT FUNCTIONALITY

(75) Inventors: Jukka Vikstedt, Oulu (FI); Christopher Peter Callender, Hampshire (GB)

(73) Assignee: Nokia Corporation, Espoo (FI)

( * ) Notice: Subject to any disclaimer, the term of this patent is extended or adjusted under 35 U.S.C. 154(b) by 507 days.

(21) Appl. No.: 11/978,985

(22) Filed: Oct. 29, 2007

(65) Prior Publication Data

US 2008/0130508 A1 Jun. 5, 2008

Related U.S. Application Data

(60) Provisional application No. 60/855,701, filed on Oct. 30, 2006.

(51) Int. Cl.
*H04W 24/00* (2009.01)
*G01R 31/08* (2006.01)
(52) U.S. Cl. .......... 455/423; 455/524; 370/247
(58) Field of Classification Search .......... 370/243, 370/247, 379, 382; 455/423, 514
See application file for complete search history.

(56) References Cited

U.S. PATENT DOCUMENTS

| | | | |
|---|---|---|---|
| 6,535,486 B1 * | 3/2003 | Naudus et al. | 370/235 |
| 6,775,293 B1 | 8/2004 | Robotham et al. | |
| 6,990,073 B1 * | 1/2006 | Sandoval | 370/232 |
| 7,194,535 B2 * | 3/2007 | Hannel et al. | 709/224 |
| 7,559,055 B2 * | 7/2009 | Yang et al. | 717/127 |
| 2002/0009134 A1 * | 1/2002 | Fischel et al. | 375/224 |
| 2004/0258091 A1 * | 12/2004 | Meyer et al. | 370/469 |
| 2005/0083917 A1 | 4/2005 | Okamoto et al. | |
| 2005/0165946 A1 * | 7/2005 | Stephens | 709/233 |
| 2005/0271031 A1 * | 12/2005 | Cho et al. | 370/349 |
| 2006/0062193 A1 * | 3/2006 | Choi et al. | 370/342 |
| 2006/0109794 A1 * | 5/2006 | Muszynski et al. | 370/251 |
| 2006/0140125 A1 * | 6/2006 | Ottinger et al. | 370/241 |
| 2006/0197879 A1 * | 9/2006 | Covell et al. | 348/700 |
| 2007/0266289 A1 * | 11/2007 | Yang | 714/742 |
| 2007/0275667 A1 * | 11/2007 | Leung et al. | 455/67.14 |
| 2007/0291644 A1 * | 12/2007 | Roberts et al. | 370/230.1 |

OTHER PUBLICATIONS

3rd Generation Partnership Project; Technical Specification Group Radio Access Network; Terminal logical test interface; Special conformance testing functions (Release 6); 3GPP TS 34.109 V6.1.0 (Jun. 2005).

3rd Generation Partnership Project; Technical Specification Group Radio Access Network; FDD Enhanced Uplink; Overall description; Stage 2 (Release 6); 3GPP TS 25.309 V6.6.0 (Mar. 2006).

(Continued)

*Primary Examiner* — Michael Thier
*Assistant Examiner* — Awet Haile
(74) *Attorney, Agent, or Firm* — Squire Sanders (US) LLP (57) ABSTRACT

Aspects of the present invention include methods, apparatuses and systems that may be used for radio frequency and performance testing of communication equipment in a telecommunications network. According to one aspect of the invention, received data may be discarded during a test whenever a device being testing is unable to store the data, for example in a buffer. According to another aspect of the invention, the device being tested will provide data for transmission processing whenever there is an opportunity during the testing to transmit data, thus allowing the device to be aggressive in its data transmission.

6 Claims, 4 Drawing Sheets

OTHER PUBLICATIONS

3$^{rd}$ Generation Partnership Project; Technical Specification Group Radio Access Network; Requirements for support of radio resource management (FDD) (Release 7); 3GPP TS 25.133 v7.5.0 (Oct. 2006).

3$^{rd}$ Generation Partnership Project; Technical Specification Group Radio Access Network; User Equipment (UE) radio transmission and reception (FDD) (Release 7); 3GPP TS 25.101 V7.5.0 (Oct. 2006).

3$^{rd}$ Generation Partnership Project; Technical Specification Group Radio Access Network; User Equipment (UE) conformance specification; Radio transmission and reception (FDD); Part 1: Conformance specification (Release 7); 3GPP TS 34.121-1 V7.2.0 (Oct. 2006).

3$^{rd}$ Generation Partnership Project; Technical Specification Group Radio Access Network; Enhanced Uplink; Overall description; Stage 2 (Release 7); 3GPP TS 25.319 V2.0.0 (May 2006).

3$^{rd}$ Generation Partnership Project; Technical Specification Group Radio Access Network; Terminal logical test interface; Special conformance testing functions (Release 6); 3GPP TS 34.109 V6.2.0 (Sep. 2006).

3$^{rd}$ Generation Partnership Project; Technical Specification Group Radio Access Network; Requirements for support of radio resource management (FDD) (Release 6); 3GPP TS 25.133 V6.15.0 (Oct. 2006).

Universal Mobile Telecommunications System (UMTS); UE Radio Access Capabilities (3GPP TS 25.306, version 7.1.0, release 7), Technical Specification ETSI TS 125 306, V7.1.0, Sep. 2006.

* cited by examiner

METHOD, APPARATUS AND SYSTEM FOR TESTING USER EQUIPMENT FUNCTIONALITY

CROSS REFERENCE TO RELATED APPLICATIONS

This application claims the benefit of U.S. Provisional Application No. 60/855,701, filed Oct. 30, 2006.

FIELD OF THE INVENTION

The present invention pertains to the field of telecommunications. More particularly the present invention relates to testing and analysis of transmitter and receiver radio frequency characteristics and performance in a telecommunications network, such as a Universal Mobile Telecommunications System (UMTS) Terrestrial Radio Access Network (UTRAN) or an evolved UTRAN (E-UTRAN).

BACKGROUND OF THE INVENTION

LTE, or Long Term Evolution, is a name for research and development involving the Third Generation Partnership Project (3GPP), to identify technologies and capabilities that can improve systems such as the UMTS. A current working assumption for LTE is that users are explicitly scheduled on a shared channel every transmission time interval (TTI) by an eNodeB. An eNodeB is an evolved Node B and is the UMTS LTE counterpart to the term "base station" in the Global System for Mobile Communication (GSM). In order for a transmitter and/or receiver, such as a user equipment terminal (UE), to communicate with the other network elements involved in UMTS LTE, the transmitter and/or receiver must be able to support the functionality and meet the performance requirements necessary to participate in UMTS LTE. In certain circumstances, evolving improvements to a communication system may require existing devices to support the services and functions related to the improvements. For example, radio frequency and performance testing may be performed on transmitters and/or receivers in order to determine whether the transmitters and/or receivers have the capabilities required for UMTS LTE services and/or newly provided technologies and capabilities based on continuing research and development aimed at improving communication systems.

E-UTRAN is a packet-based system, and it is likely that under test conditions data rates may vary between the downlink and uplink. Therefore, test situations may arise where the transmitter and/or receiver, i.e. UE, that is being tested may encounter unspecified situations as a result of the difference in data rates between the uplink and downlink. For example, if the downlink data rate is greater than the uplink data rate due to current radio conditions or system commands then the UE or test device, i.e. system simulator (SS), may have more data packets than it can handle and may not be able to meet the specified requirements for the testing, for example returning packets within a specified time. This may lead to unspecified behavior in the UE or test device. This unspecified behavior may prevent the testing from being completed, or produce inaccurate or inconsistent test results. A similar situation may arise if the UE or test device is able to transmit more data than is received.

For example, high speed uplink packet access (HSUPA) is a 3GPP access technology aimed at increasing capacity and throughput on the uplink channel, while also reducing delay. In order to accomplish this, HSUPA includes an enhanced dedicated channel (E-DCH), which is intended to enhance the uplink channel. HSUPA and E-DCH are discussed in 3GPP TS 25.309 FDD Enhanced Uplink; Overall description; Stage 2 (Release 6) (2006-03), which is hereby incorporated by reference in its entirety. However, user equipment terminals (UE) must support E-DCH and meet the performance requirements defined for E-DCH in 3 GPP TS25.101 User Equipment (UE) radio transmission and reception (FDD) (Release 7) (2006-10) and 3GPP TS25.133 Requirements for support of radio resource management (FDD) (Release 7) (2006-10) in order to take advantage of this technology, which are hereby incorporated by reference in their entirety. Therefore, a UE must be tested in order to determine whether the particular UE is capable of supporting E-DCH and meeting the performance requirements. The testing of a particular UE may focus on radio frequency and performance testing. Test methods used to verify that a transmitter and/or receiver, i.e. UE, has the characteristics required to support E-DCH, and is capable of receiving downlink E-DCH channels are specified in 3GPP TS 34.121-1 User Equipment (UE) conformance specification; Radio transmission and reception (FDD); Part 1: Conformance specification (Release 7) (2006-10), which is hereby incorporated by reference in its entirety.

The E-DCH downlink channels include E-DCH absolute grant channel (E-AGCH), E-DCH relative grant channel (E-RGCH) and E-DCH hybrid ARQ indicator channel (E-HICH). E-HICH is a downlink physical channel that is used by the hybrid automatic repeat request (HARQ) process to acknowledge E-DCH transmissions from the UE. E-AGCH is a shared downlink channel that is used to indicate to the UE how much data can be sent on the uplink, allowing the UE to determine the E-DCH traffic format combination (TFC) and maximum allowed power. E-RGCH is a shared downlink channel that is used to decrease or increase the uplink resources compared to the previously used value. Even though E-DCH is designed as an uplink enhancement, the UE must be capable of receiving downlink E-DCH channels because these feedback channels are required to indicate which data rates the UE has been scheduled to use (E-AGCH, E-RGCH), and to indicate whether the network has successfully received a transmission from the UE (E-HICH). During testing to determine whether a particular UE can receive downlink E-DCH channels, and in some uplink test cases, the UE has to generate data for its uplink E-DCH data and control channels However, test methods available in 3GPP TS 34.109 Terminal logical test interface; Special conformance testing functions (Release 6) (2006-09) which is hereby incorporated by reference in its entirety, are insufficient to enable reliable transmission on the uplink E-DCH channel during the testing.

Previously defined test cases such as those for release 99 DCH in 3GPP use either a UE loop back mode 1 or 2 test. Loop back modes 1 and 2 are discussed in 3GPP TS 34.109 Terminal logical test interface; Special conformance testing functions (Release 6) (2006-09). As stated previously, E-DCH conformance testing requires that the UE under testing has data to transmit over the uplink channel in its E-DCH dedicated physical data channel (E-DPDCH). E-DPDCH is used to carry the E-DCH data transport channel. However, during the testing the data rate at which the UE under test may be allowed to transmit on the uplink can vary due to absolute and relative grants that the UE receives from a tester, for example a system simulator (SS), and retransmissions due to the uplink HARQ procedures.

UE test loop function may be used for testing of receiver characteristics based on BER (Bit Error Ratio) measurement. The SS calculates BER from a bit-by-bit comparison of data sent to and received from UE. BER measurement requires symmetric radio access bearer (RAB) bit-rates. The UE test loop function may also be used for testing of receiver performance based on BLER (BLock Error Ratio) measurement. The SS calculates BLER based on the RLC STATUS SDU received from the UE operating in RLC acknowledged mode; or the SS calculates BLER based on checking returned downlink data and downlink CRC by UE operating in UE test loop mode 2. The UE test loop function may also be used for testing of UE Blind Transport Format Detection, testing of UE transmitter characteristics, testing of UE transmitter DTX characteristics, and/or testing of radio bearers (RB), for example the UE test loop function emulates terminal equipment.

Test methods such as those previously defined for testing release 99 DCH in 3GPP in 34.109 Terminal logical test interface; Special conformance testing functions (Release 6) (2006-09), where the data received on the downlink is looped directly back to the uplink have been shown to be insufficient for testing due to the varying data rate that may occur during testing, and because the UE being tested should always have data to transmit in the uplink E-DCH. Loop back mode 1 in TS 34.109 (2006-09) was designed for continuous and fixed downlink and uplink data transfer, where the UE has a certain time to loop back the downlink data to uplink channels, i.e. loop back delay. Loop back delay is the delay between received downlink radio frames and their corresponding uplink radio frames produced from the received data.

For example, in FIG. 5.3.2.9.1 of 3GPP TS 34.109 (2006-09) the latest allowed transmission of a corresponding radio from the user equipment is 10 radio frames. When the uplink data rate varies, for example due to system conditions or commands, it is impossible for the UE being tested to guarantee the fixed loop back delay required. In addition, when the uplink data rate on E-DCH is smaller than the downlink data rate on high speed downlink packet access (HSDPA) channel the packets are buffered by the UE. However, in this situation when the buffers are filled the UE behavior is unspecified, which typically may result in the UE resetting and therefore not completing the testing. It appears that UE buffer overflows cannot be avoided by balancing the downlink data rate with the uplink data rate. If this approach was used using the test methods discussed in TS 34.109 (2006-09) the loopback of data to the E-DCH may not occur or may be otherwise inconsistent.

Testing to determine whether a UE supports E-DCH and meets the performance requirements is just one example in which testing UE capabilities may result in unfavorable or inconsistent results due to the varying transmission rates on uplink and downlink channels. Similar situations may arise during testing of E-UTRAN uplink and feedback transmitted on the downlink related to the uplink in which test methods are insufficient to provide accurate and complete results.

Therefore, what is needed is a test that is suitable for testing transmitter and/or receiver capabilities and performance, for example to determine whether the transmitter and/or receiver supports a particular access technology (i.e. E-DCH), where test conditions may include variable data rates on both uplink and downlink channels. In particular, what may be needed is a way to generate reliable data transmission flow on E-DPDCH for E-DCH testing.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to a first aspect of the present invention, a method is provided that may include establishing a size limit for a buffer configured to store at least one data unit during a testing event, determining if a data unit received during the testing event and an amount of data units present in the buffer will exceed the size limit, and discarding at least part of the received data unit during the testing even when the received data unit and the amount of data units will exceed the size limit of the buffer.

According to the first aspect of the present invention, the method may also include receiving the received data unit from a system simulator.

According to the first aspect of the present invention, establishing the size limit for the buffer may be based on a minimum buffer size for a user equipment terminal including the buffer.

According to the first aspect of the present invention, establishing the size limit for the buffer may be based on at least one capability of a user equipment terminal including the buffer.

According to the first aspect of the present invention, establishing the size limit for the buffer may be based on a multiple of a maximum number of bits of a transport block that can be transmitted in a transmission time interval.

According to the first aspect of the present invention, the testing event may be related to determining whether a user equipment terminal meets at least one performance requirement of a telecommunications network.

According to the first aspect of the present invention, the testing event may be related to determining whether a user equipment terminal supports high speed uplink packet access.

According to a second aspect of the present invention, a computer program product that includes a computer readable storage structure embodying computer program code thereon for execution by a computer processor is provided. In accordance with the second aspect the present invention the computer program code includes instructions for performing a method including establishing a size limit for a buffer configured to store at least one data unit during a testing event, determining if a data unit received during the testing event and an amount of data units present in the buffer will exceed the size limit, and discarding at least part of the received data unit during the testing even when the received data unit and the amount of data units will exceed the size limit of the buffer.

According to a third aspect of the present invention, an apparatus is provided that may include an establishment module for establishing a size limit of a buffer configured for storage of at least one data unit during a testing event, a comparator for determining if a data unit received during the testing event and an amount of data units present in the buffer will exceed the size limit, and a discarder for discarding at least part of the received data unit during the testing event when the received data unit and the amount of data units will exceed the size limit of the buffer.

According to the third aspect of the present invention, the apparatus may also include a receiver for receiving the received data unit from a system simulator.

According to the third aspect of the present invention, establishment module may be configured to establish the size limit for the buffer based at least on a minimum buffer size required for a user equipment terminal including the buffer.

According to the third aspect of the present invention, the establishment module may be configured to establish the size limit for the buffer based at least on at least one capability of a user equipment terminal including the buffer.

According to the third aspect of the present invention, the establishment module may be configured to establish the size limit for the buffer based at least on a multiple of a maximum number of bits of a transport block that can be transmitted in a transmission time interval.

According to the third aspect of the present invention, the testing event may be related to determining whether a user equipment terminal including the apparatus meets at least one performance requirement of a telecommunications network.

According to the third aspect of the present invention, the testing event includes determining whether the apparatus supports high speed uplink packet access.

According to the third aspect of the present invention, the apparatus may be included in a user equipment terminal or include a user equipment terminal.

According to a fourth aspect of the present invention, a method is provided that may include recognizing an opportunity for enhanced dedicated channel data transmission during a testing event, removing enhanced dedicated channel data from a transmission buffer, and processing the data for enhanced dedicated channel transmission.

According to the fourth aspect of the present invention, the method may also include transmitting at least part of the data to a system simulator.

According to the fourth aspect of the present invention, the testing event may be related to determining whether a user equipment terminal meets at least one performance requirement of a telecommunications network.

According to the fourth aspect of the present invention, the testing event may be related to determining whether a user equipment terminal supports high speed uplink packet access.

According to a fifth aspect of the present invention, a computer program product including a computer readable storage structure embodying computer program code thereon for execution by a computer processor is provided. In accordance with the fifth aspect of the invention the computer program code includes instructions for performing a method including recognizing an opportunity for enhanced dedicated channel data transmission during a testing event, removing enhanced dedicated channel data from a transmission buffer, and processing the data for enhanced dedicated channel transmission.

According to a sixth aspect of the present invention, an apparatus is provided that may include a recognizer for recognizing an opportunity for enhanced dedicated channel data transmission during a testing event, a provider for removing enhanced dedicated channel data from a transmission buffer, and for processing the data for enhanced dedicated channel transmission.

According to the sixth aspect of the present invention, the apparatus may also include a transmitter for transmitting at least part of the data to a system simulator.

According to the sixth aspect of the present invention, the testing event may be related to determining whether a user equipment terminal including the apparatus meets at least one performance requirement of a telecommunications network.

According to the sixth aspect of the present invention, the testing event may be related to determining whether a user equipment terminal including the apparatus supports high speed uplink packet access.

According to the sixth aspect of the present invention, the apparatus may be included in a user equipment terminal or include a user equipment terminal.

According to the seventh aspect of the present invention, a system is provided that may include a system simulator configured to transmit at least one data unit during a testing event, and a user equipment terminal configured to receive the at least one data unit. The user equipment terminal is configured to determine if the at least one received data unit will exceed an amount of available space in a buffer of the user equipment terminal during the testing event. The user equipment terminal may be further configured to discard at least part of the at least one received data unit if the received data unit will exceed the amount of available space, and to recognize an opportunity for transmission and determine if at least one data unit is stored in the buffer.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1:
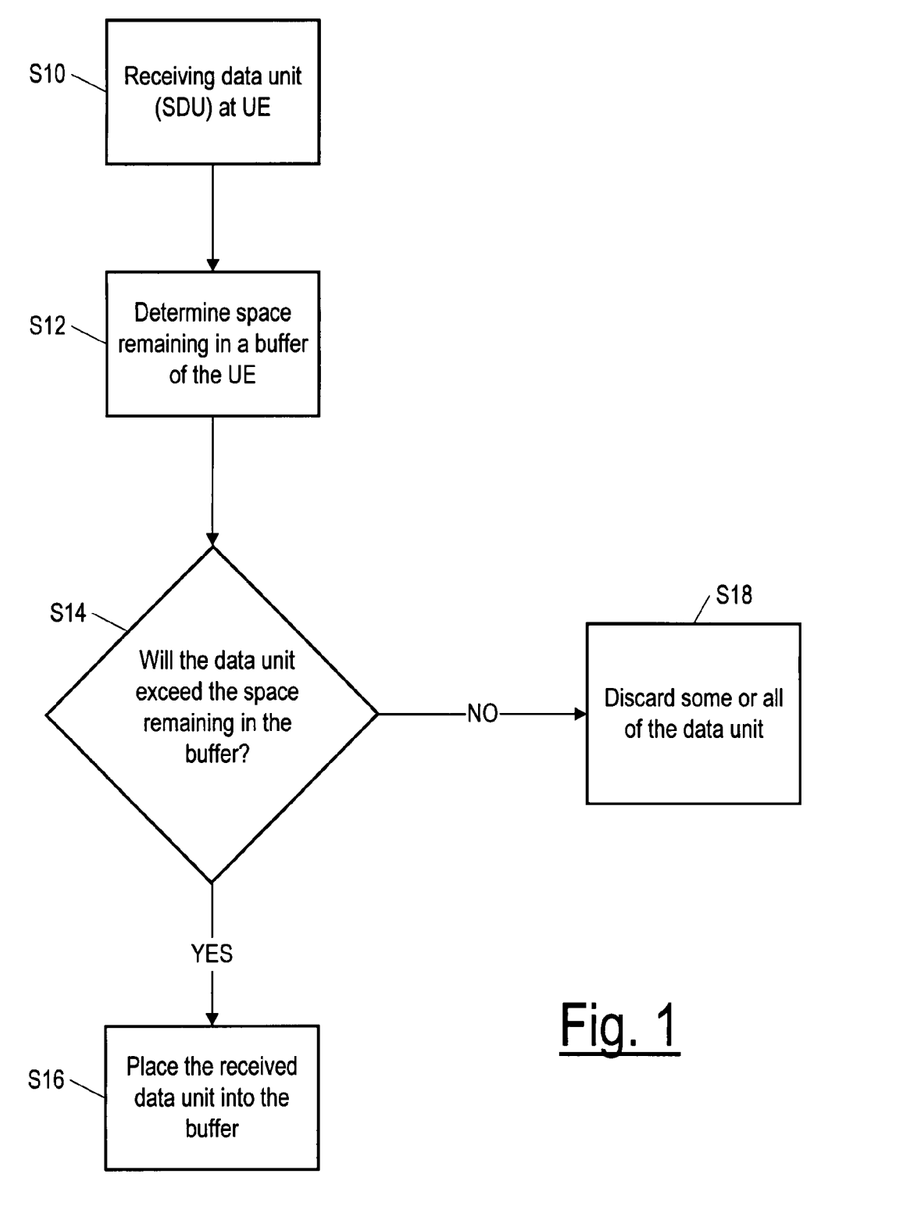
FIG. 1 is a flow diagram showing steps that may be implemented in a loop back method according to an aspect of the invention.

FIG. 1 is a flow diagram of a method according to an exemplary embodiment of the invention. The method shown in FIG. 1 may be used determine whether a particular transmitter and/or receiver supports and meets the performance requirements necessary to perform communications in a telecommunications network, such as E-UTRAN involving communication through transfer of packets. For example, the method may be implemented as part of a loop back test used to determine transmitter and/or receiver, for example a user equipment terminal (UE), characteristics and capability to receive enhanced dedicated channel (E-DCH) downlink channels.

In the method according to the exemplary embodiment of the invention shown in FIG. 1 the UE is allowed to discard partial or full packets after the size of a buffer exceeds a certain limit. In accordance with this exemplary embodiment of the invention, the method may include a step S10 of receiving a data unit or units or a data block, for example a service data unit (SDU) or any type of data communicated by a packet based telecommunications system. The data unit or packet may be received from a system simulator (SS) that is transmitting the data unit to a UE during testing. In addition, the data unit or packet may be transmitted during data communication between a transmitter and receiver on a downlink channel. The method may also include a step S12 of determining the amount of space remaining in the buffer of the UE. This may involve checking the amount of data currently present in the buffer. The method may also include a step S14 of determining if the buffer size will exceed a specified limit, for example if the data unit or packet will exceed the space remaining in the buffer. If the buffer size exceeds or will exceed the specified limit then in step S18 the UE will discard all or part of the received data unit or packet. If sufficient space remains in the buffer, then in step S16 the data unit or packet is copied from the received data unit or packet into the buffer. It is understood that the exemplary embodiment of the method according to the present invention shown in FIG. 1 may be performed during characteristic and performance requirement testing of a particular transmitter and/or receiver that is to be employed for communication in a telecommunications network, such as E-UTRAN.

For example in the exemplary embodiment discussed above, for radio link control (RLC) unacknowledged mode, when the uplink RLC SDU does not fit in the transmission buffer, the UE may be able to discard the uplink RLC SDU block. The UE may perform the discard either by the loopback entity or by the UE RLC entity. For RLC unacknowledged mode the minimum total buffer size supported by the UE may be ten kilobytes. However, it is understood that the value for the buffer size may be modified depending upon the E-DCH RF testing scenario and/or the UE E-DCH categories.

Figure 2:
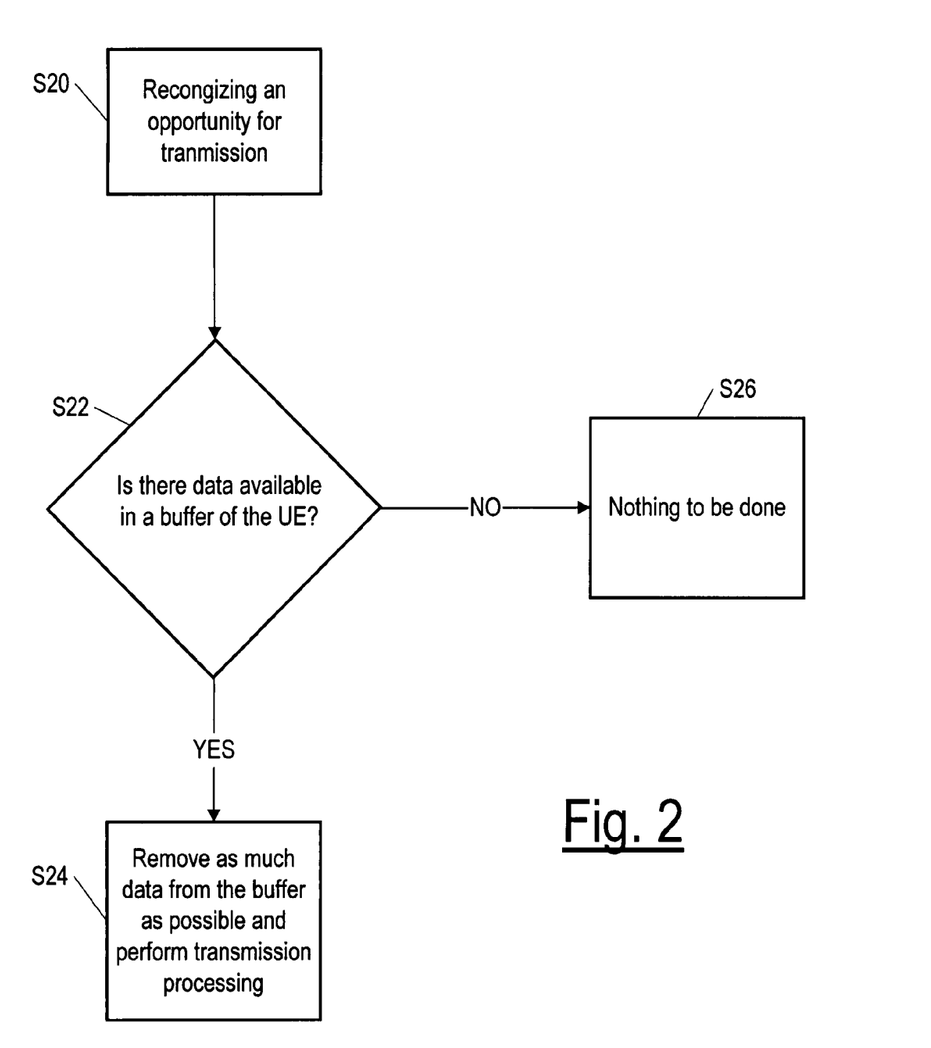
FIG. 2 is a flow diagram showing steps that may be implemented in a loop back method according to an aspect of the invention.

FIG. 2 is a flow diagram of a method according to another exemplary embodiment of the invention. It is understood that the steps shown in FIG. 2 may be implemented in a loop back test method, for example a loop back test method used for E-DCH radio frequency and performance testing of user equipment terminals (UE), in order to determine whether a user equipment terminal supports high speed uplink packet access (HSUPA). It is also understood that the method shown in FIG. 2 may be implemented in any testing scenario used to determine whether a transmitter and/or receiver meets performance requirements or supports particular services. In general, looped back data transmitted during testing is processed for E-DCH transmission in the manner known to one of skill in the art, i.e. whenever there is an opportunity for transmission of new data. Much of the E-DCH functionality in the UE is determined by the occupancy of the E-DCH transmission buffers. For example, a bit referred to as the "happy bit" is set "unhappy" state by the UE if the transmission buffers of the UE are full and would be able to make use of a higher rate grant by the scheduler in the UMTS terrestrial radio access network (UTRAN) or E-UTRAN. The method according to the exemplary embodiment shown in FIG. 2 may be useful for testing this type of functionality. The method may include a step S20 of recognizing an opportunity for transmission, for example E-DCH transmission of data. The method may also include a step S22 of determining if there is data available, for example E-DCH data, in the transmission buffers of the UE. If there is data available, then in step S24 as much data as possible is removed from the buffer in order to provide the data for transmission processing, for example E-DCH transmission processing of the data. Once data has been placed in the transmission buffer, it is transmitted by the UE using the functionality, for example E-DCH, as known by one of skill in the art in the same way as if the data had originated from an application layer. If there is no data present in the transmission buffers, then there is nothing to be done. It is understood that the exemplary embodiment of the method according to the present invention shown in FIG. 2 may be performed during characteristic and performance requirement testing of a particular transmitter and/or receiver that is to be employed for communication in a telecommunications network, such as E-UTRAN. For example, for a UE operating in UE test loop mode 1, a loopback delay requirement, i.e. delay between received downlink radio frames and corresponding uplink radio frames produced from the received data, is not applicable for unacknowledged mode radio bearers configured on HS-DSCH and E-DPDCH. For test cases using UE test loop mode 1, for example, the data rate may vary depending on absolute and relative grants given by the system simulator (SS). Furthermore, overflow of the UE buffer may occur since the SS may need to guarantee continuous data in the uplink.

It is understood that the exemplary embodiments of the invention shown in FIG. 1 and FIG. 2 may be performed independently of each other. It is also understood that these methods may be implemented or performed during the same characteristic or performance test method or in the same UE.

Figure 3:
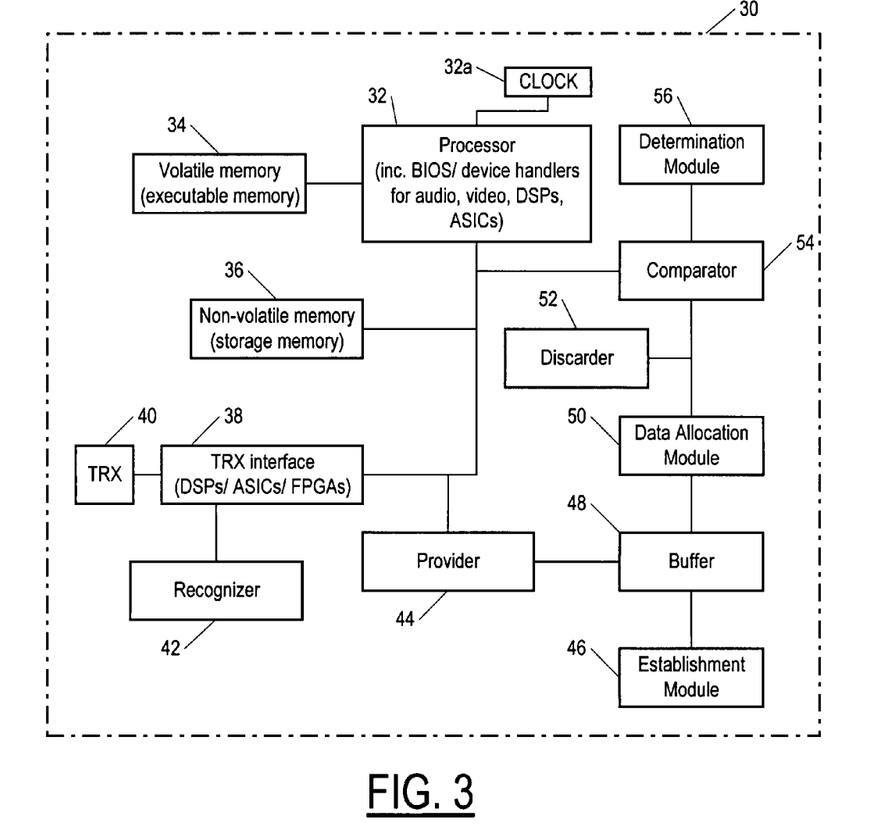
FIG. 3 is a block diagram of a communication terminal that is configured to carry out an aspect of the invention.

FIG. 3 shows a communication terminal 30, such as a user equipment terminal, according to an exemplary embodiment of the invention. The communication terminal 30 may include a processor 32 for controlling operation of the device, including all input and output. The processor, whose speed/timing is regulated by a clock 32a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 40 via a TRX interface 38 including possibly one or more digital signal processors (DSPs), application specific integrated circuits (ASICs), and/or field programmable gate arrays (FPGAs). The TRX enables communication, i.e. transmission and reception of data, over the air with other similarly equipped communication terminals, including system simulators (SS). The communication terminal 30 may also include volatile memory, i.e. so-called executable memory 34, and also non-volatile memory 36, i.e. storage memory. The processor 32 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

In an exemplary embodiment of the invention shown in FIG. 3 the communication terminal 30 may also include a comparator 54 for determining if a received data unit or packet, i.e SDU, will exceed an amount of available space in a buffer 48 of the communication terminal 30. It is understood that the communication terminal 30 may include one or more buffers, but only one buffer 48 is shown for simplicity. The received data unit or packet may be received by the communication terminal 30 during characteristic and performance testing of the communication terminal 30 in order to determine whether the communication terminal 30 supports technologies, for example newly implemented technologies, of a communications network, i.e. UTRAN or E-UTRAN. The communication terminal 30 may also include a discarder 52 for discarding at least part of the received data unit or packet when the received data unit or packet will exceed the amount of available space in the buffer 48. The communication terminal 30 may also include a data allocation module 50 for placing the received data unit or packet in the buffer 48 if the received data unit will not exceed the amount of available space of the buffer 48. The communication terminal 30 may also include a determination module 56 for determining the amount of available space in the buffer 48, and the determination module 56 may be configured to check the amount of data units that are currently present in the buffer. The communication terminal 30 may also include an establishment module 46 for establishing the size limit of the buffer 48, for example how many data units or packets the buffer can contain at a particular time. The size limit may be the minimum buffer size required for the communication terminal 30, or may be dependent upon the capabilities of the communication terminal 30. Furthermore, the size limit may be established by multiplying the maximum number of bits of a transport block, for example a E-DCH transport block, that can be transmitted in a transmission time interval (TTI), i.e. a E-DCH TTI, by a predetermined constant.

In another exemplary embodiment of the invention the communication terminal 30 shown in FIG. 3 may include a recognizer 42 for recognizing an opportunity for data transmission. The communication terminal 30 may also include the determination module 56 for determining if data is present in the buffer 48. The communication terminal may further include a provider 44 for providing the data present in the buffer 48 for transmission, for example by E-DCH functionality as if the data has originated from an application layer.

Figure 4:
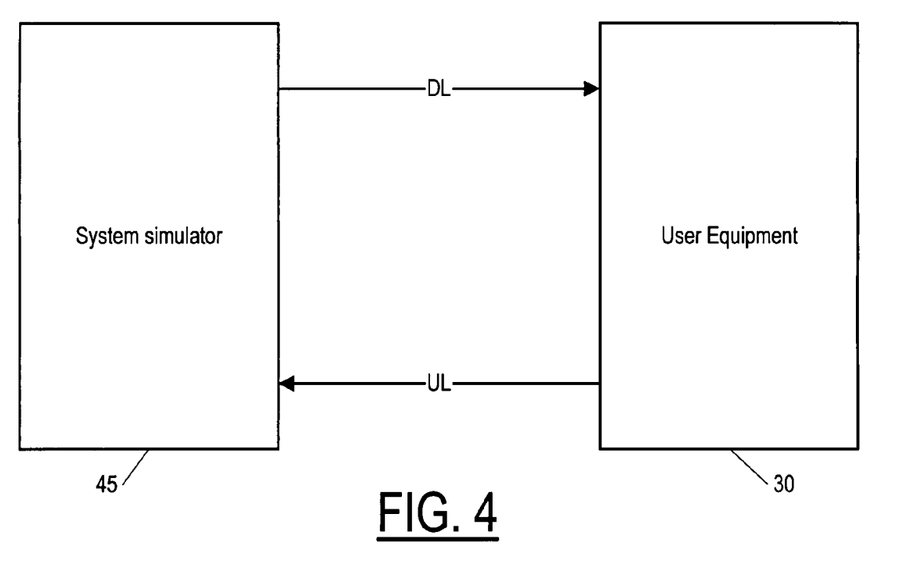
FIG. 4 is a block diagram of a system in which the method according to an aspect of the invention may be performed.

FIG. 4 shows a system comprising a system simulator (SS) 45 and a communication terminal 30, for example a user equipment terminal (UE) in which the test method according to an exemplary embodiment of the invention may be implemented. The system simulator 45 is configured to transmit data packets on the downlink channel (DL) to the user equipment, and the user equipment 30 receives these data packets and in turn transmits the data packets back to the system simulator 45 on the uplink channel (UL). The data rates and reception or transmission opportunities may be variable. For example, reception of HSDPA user data on the downlink, or transmission of E-DCH user data on the uplink may be stalled for a time. This may happen, for example, if retransmissions occur due to the HARQ process on either the uplink or the downlink. As the UE 30 is allowed to discard downlink data once its buffer 48 occupancy exceeds a specified size, uplink data stalls do not cause a problem from a testing perspective, and there is no need for the UE to reset or perform other unspecified behavior. If the downlink is stalled for a sufficient period of time, the UE 30 will eventually exhaust all the received data which is stored. In this case, the uplink, for example E-DCH uplink, may behave in the same way as is known by one of skill in the art as if no user data was delivered by an application, and uplink transmission of user data will stop. However, it is understood that some data may still typically be periodically transmitted on the E-DPDCH, for example scheduling information generated by the MAC-e layer in the UE below radio link control (RLC) layer.

The functionality described above can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention can be provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
establishing a size limit for a buffer configured to store at least one data unit during a testing event in a mobile telecommunications network, wherein the testing event occurs during operation of a user equipment comprising the buffer with the mobile telecommunications network to determine whether the user equipment is capable of supporting enhanced dedicated channel and meeting performance requirements,
wherein the establishing the size limit for the buffer is based on a multiple of a maximum number of bits of an enhanced dedicated channel transport block, that can be transmitted in a transmission time interval (TTI), by a predetermined constant,
receiving a data unit from a system simulator,
determining if the data unit received during the testing event and an amount of data units present in the buffer will exceed the size limit, and
discarding at least part of the received data unit during the testing event when the received data unit and the amount of data units present in the buffer will exceed the size limit of the buffer,
recognizing an opportunity for enhanced dedicated channel data transmission during the testing event in the mobile telecommunications network,
removing enhanced dedicated channel data from the buffer, and processing the data for enhanced dedicated channel transmission; and transmitting at least part of the data to the system simulator via the enhanced dedicated channel.

2. The method according to claim 1, wherein the establishing the size limit for the buffer is based on at least one capability of the user equipment comprising the buffer.

3. A computer program product comprising a non-transitory computer readable storage medium embodying computer program code thereon for execution by a computer processor is provided, wherein the computer program code comprises instructions for performing a method according to claim 1.

4. An apparatus, comprising:
an establishment module for establishing a size limit of a buffer configured for storage of at least one data unit during a testing event in a mobile telecommunications network, wherein the testing event occurs during operation of the apparatus with the mobile telecommunications network to determine whether the apparatus is capable of supporting enhanced dedicated channel and meeting performance requirements,
wherein the establishing the size limit for the buffer is based on a multiple of a maximum number of bits of an enhanced dedicated channel transport block, that can be transmitted in a transmission time interval (TTI), by a predetermined constant;
a receiver for receiving a data unit from a system simulator;
a comparator for determining if the data unit received during the testing event and an amount of data units present in the buffer will exceed the size limit; and
a discarder for discarding at least part of the received data unit during the testing event when the received data unit and the amount of data units present in the buffer will exceed the size limit of the buffer;
a recognizer for recognizing an opportunity for enhanced dedicated channel data transmission during the testing event in the mobile telecommunications network,
a remover for removing enhanced dedicated channel data from the buffer, and processing the data for enhanced dedicated channel transmission; and transmitting at least part of the data to the system simulator via the enhanced dedicated channel.

5. The apparatus according to claim 4, wherein the establishment module is configured to establish the size limit for the buffer based at least on at least one capability of the apparatus comprising the buffer.

6. A system, comprising:

a system simulator configured to transmit at least one data unit during a testing event in a mobile telecommunications network, wherein the testing event occurs during operation of a user equipment (UE) comprising a buffer with the mobile telecommunications network to determine whether the user equipment (UE) is capable of supporting enhanced dedicated channel and meeting performance requirements, and the user equipment is configured to establish a size limit for the buffer, wherein the establishing the size limit for the buffer is based on a multiple of a maximum number of bits of an enhanced dedicated channel transport block, that can be transmitted in a transmission time interval (TTI), by a predetermined constant, and the user equipment configured to receive the at least one data unit, wherein the user equipment is configured to determine if the data unit received during the testing event and an amount of data units present in the buffer will exceed the size limit, and to discard at least part of the received data unit during the testing event when the received data unit and the amount of data units present in the buffer will exceed the size limit of the buffer, wherein the user equipment terminal is configured to recognize an opportunity for enhanced dedicated channel data transmission during the testing event in the mobile telecommunications network, and wherein the user equipment is configured to remove enhanced dedicated channel data from the buffer, and to process the data for enhanced dedicated channel transmission; and to transmit at least part of the data to the system simulator via the enhanced dedicated channel.

* * * * *